(12) United States Patent
Noble et al.

(10) Patent No.: US 6,215,064 B1
(45) Date of Patent: Apr. 10, 2001

(54) ELECTRONICS JUMPER MANAGEMENT ASSEMBLY

(75) Inventors: Jennifer D. Noble, Fort Worth; Carrie Lynn Gordon, Saginaw, both of TX (US)

(73) Assignee: Siecor Operations, LLC, Hickory, NC (US)

( * ) Notice: Subject to any disclaimer, the term of this patent is extended or adjusted under 35 U.S.C. 154(b) by 0 days.

(21) Appl. No.: 09/272,925

(22) Filed: Mar. 19, 1999

(51) Int. Cl.[7] .................................................. H01R 13/46
(52) U.S. Cl. ........................ 174/59; 385/135; 361/826; 174/60
(58) Field of Search ............................ 174/59, 60, 35 C, 174/DIG. 9, 135; 361/724, 728, 730, 826, 827; 385/135, 51; 29/825, 868

(56) References Cited

U.S. PATENT DOCUMENTS

| | | | |
|---|---|---|---|
| 5,412,751 | * 5/1995 | Siemon et al. | 385/135 |
| 5,546,495 | * 8/1996 | Bruckner et al. | 385/135 |
| 5,825,962 | * 10/1998 | Walters et al. | 385/135 |
| 5,945,633 | * 8/1999 | Oh et al. | 174/59 |
| 5,987,203 | * 11/1999 | Abel et al. | 385/51 |

* cited by examiner

Primary Examiner—Kristine Kincaid
Assistant Examiner—Dhiru R Patel
(74) Attorney, Agent, or Firm—Michael L. Leetzow; Christopher C. Dremann

(57) ABSTRACT

A jumper management assembly for managing the routing of fiber optic cable jumpers is disclosed. The assembly fits within a conventional equipment rack. The assembly has a panel with two fiber support trays attached on its back side. The assembly also has ports located in the panel near the support trays. An excess length of a fiber optic cable jumper may be routed from the rear of electronics or other components in the equipment rack using the support trays, portals, and panel.

14 Claims, 2 Drawing Sheets

ELECTRONICS JUMPER MANAGEMENT ASSEMBLY

BACKGROUND

The present invention is directed to a jumper management assembly and in particular to an assembly for managing optical fibers that mounts to a rack containing a variety of components, including electronic systems.

Fiber optic cables are used in a variety of ways, including transmitting voice, data, and video communications, which may require the use of electronic systems and other components that may require fiber optic jumpers (e.g., transceivers, connector panel housings, etc.). These electronic systems and components are usually flush mounted in a large equipment rack, with the majority of the system protruding from the rear of the equipment rack. With connections for the optical fibers being located on the rear side of the electronics, a large number of fiber optic cables must be routed from the rear side of the electronics to the front side in order to be interconnected with other fiber optic cables, usually in the connector panel housings. Care must be taken in the routing of the optical fibers to avoid bending the optical fibers more than a specified radius (the bend radius), usually 1.25–1.50 inches. Additionally, sagging and intertwined optical fibers resulting from the routing present not only a logistical problem, but an unsightly mess.

SUMMARY OF THE INVENTION

Thus, a routing system is needed that alleviates the problem of sagging, intertwined optical fibers as they are routed from the front to rear, and rear to front, of an equipment rack.

Additional features and advantages of the invention will be set forth in the description which follows, and, in part, will be apparent from the description, or may be learned by practice of the invention. The objectives and other advantages of the invention will be realized and attained by the assembly particularly pointed out in the written description and claims hereof, as well as the appended drawings.

To achieve these and other advantages, and in accordance with the purpose of the invention as embodied and broadly described herein, the present invention is directed to an optical fiber management assembly for routing optical fiber in equipment racks, the management assembly comprising a panel mountable to the equipment racks in the vicinity of electronic components, the panel having at least one portal therethrough allowing for optical fibers to be passed therethrough, and at least one support tray extending rearward of the panel to support the optical fibers from a rearward side of the electronic components to a front side of the equipment racks.

In another aspect, the invention is also directed to a method of routing optical fibers in an equipment rack using an optical fiber management assembly, the equipment rack having electronic components and connector panel housings, and the optical fiber management assembly having a panel with at least one portal for optical fibers to be passed therethrough; and at least one support tray extending rearward of the panel, the method comprising the steps of guiding the fiber optic cable jumper along the support tray with one end of the fiber optic cable jumper extending through the portal, attaching one end of the fiber optic jumper to the electronic component, attaching another end of the fiber optic jumper to a connector sleeve in the connector panel housing.

It is to be understood that both the foregoing general description and the following detailed description are exemplary and explanatory only and are not restrictive of the invention as claimed.

BRIEF DESCRIPTION OF THE DRAWINGS

The accompanying drawings, which are incorporated in and constitute a part of this specification, illustrate an embodiment of the invention and, together with the description, serve to explain the principles of the invention.

DETAILED DESCRIPTION OF THE INVENTION

Figure 1:
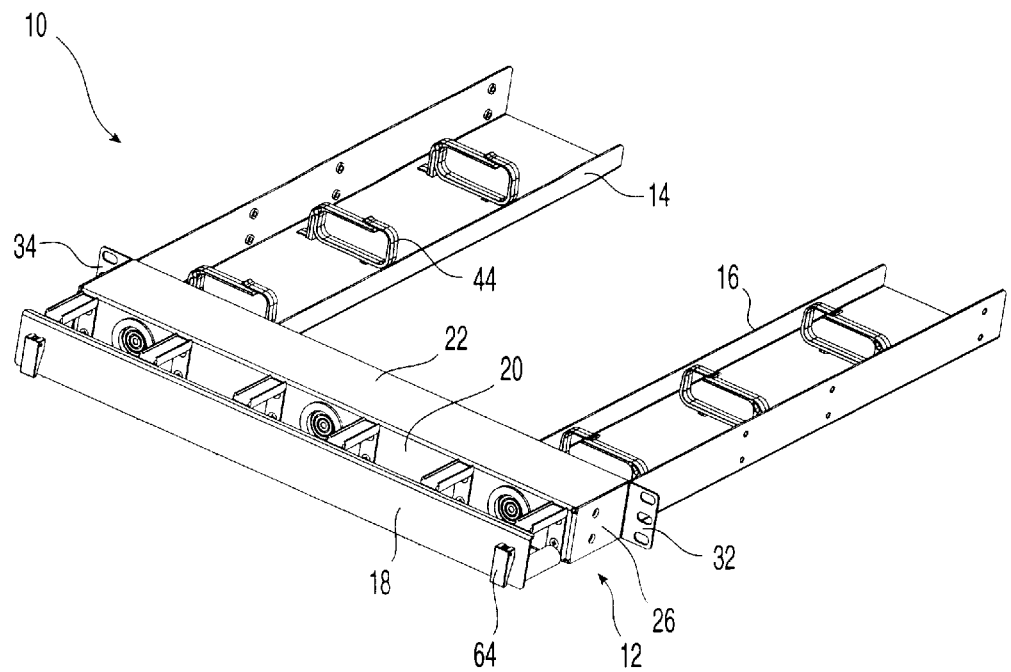
FIG. 1 is a perspective view showing jumper management assembly constructed according to the present invention.

As illustrated in FIG. 1, jumper management assembly 10 has a front panel 12, two support trays 14,16, and a removable cover 18. The front panel 12 includes a base wall 20, with a top wall 22, bottom wall 24, and side walls 26,28, which define a rear cavity 30. The panel 12 also has two mounting flanges 32,34 attached to the side walls 26,28 at the rear of the panel 12, that mount to an equipment rack 36 and allows the front panel 12 to extend forward of the equipment rack 36. See FIGS. 2 and 4.

Figure 4:
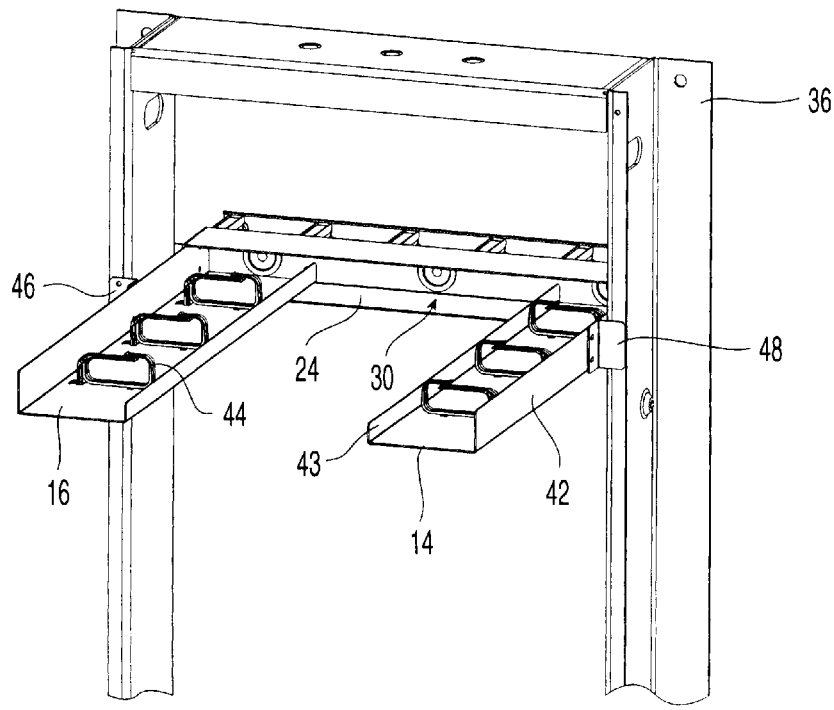
FIG. 4 is rear perspective view of the assembly and portion of the rack of FIG. 2, without the electronic component for clarity.

The two support trays 14,16 are attached to and extending rearward from front panel 12. As seen in FIG. 4, the support trays 14,16 are preferably mounted in the rear cavity 30. The support trays 14,16 are generally unshaped, although one of the upwardly extending sides 42 may be longer than the other 43. The trays 14, 16 could also be of other shapes, too, as long as they supported the optical fibers. The support trays 14, 16 also have routing clips 44 attached to the support trays to loosely hold optical fibers therein. While the clips 44 are shown to be about as wide as the supporting trays 14, 16, they could be of any size (width, height, and length) as needed to hold the optical fibers that are to be routed. The support trays 14, 16 may also have brackets 46, 48 attached in an appropriate position to attach to the equipment rack 36. See FIG. 4.

The support trays 14, 16 may also be mounted adjacent to portals 49 that are located in base wall 20. Preferably, portals 49 include a grommet 51 to protect the optical fibers as they pass through the portals 49 from damage due to sharp edges and prevent the fiber from being pushed down on a hard edge. While the preferred embodiment illustrates three portals 49, any number of portals could be used. The two side portals allow for the fibers to be easily routed back and forth along the support trays 14, 16. In the event that fibers may need to be routed directly from the front of the assembly 10 to the front of another rack-mounted element (such as another assembly or connector panel housing, for example), the optical fibers could be routed behind assembly 10 through the middle portal 49 (or even the end portals), without the optical fibers passing between the base wall 20 and the cover 18, which would make the front of the rack unsightly and unmanageable.

Figure 2:
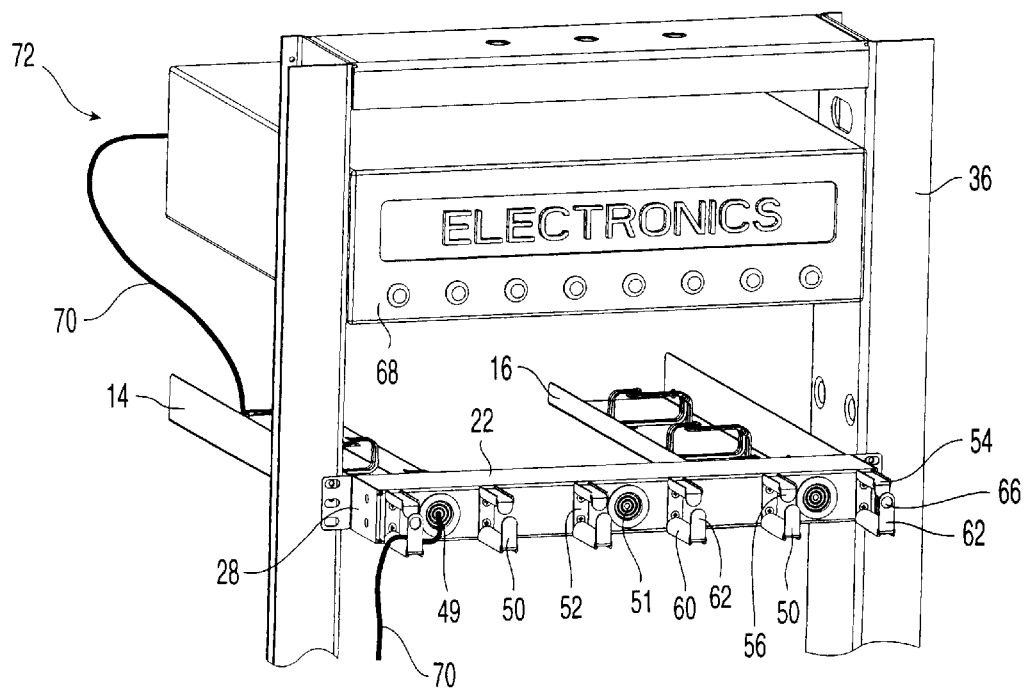
FIG. 2 is a perspective view of the assembly of FIG. 1 without the cover on and the assembly installed in a portion of an equipment rack.

Referring to FIG. 2, with the assembly 10 shown mounted in a rack 36, a plurality of brackets 50 that are secured to the front surface of panel 12 and extend forward therefrom to support the optical fibers as they are routed along the front of panel 12. The brackets 50 are preferably spaced evenly along the front panel 12, although any arrangement that prevents the sagging of optical fibers could be used. Each of the brackets 50 are generally made from integrally formed members and are generally square in shape. Specifically, the brackets 50 include a vertical rearward brace 52, a horizontal top brace 54, a downward protruding flange 56 on the forward end of top brace 54, a horizontal bottom brace 60, and an upward protruding flange 62. Bottom braces 60 are longer than top braces 54 so that flanges 62 are parallel to, but located forward of flanges 56, thereby providing an opening into the bracket 50 so the optical fibers can be inserted without excessive bending. Brackets 50 are mounted to base wall 20 along their rearward braces 52.

Cover 18 detachably mounts to the flanges 62 of brackets 50 with a fastener 64 on each end of the cover 18. Attaching cover 18 to flanges 62 result in cover 18 being parallel to and spaced forward from base wall 20 by attachment to the brackets 50. The fastener 64 is preferably a swell latch that is inserted into a hole 66 in flanges 62. However, any other fasteners (e.g., a quarter-turn, etc.) that allow for the cover 18 to be removably attached are also acceptable.

Figure 3:
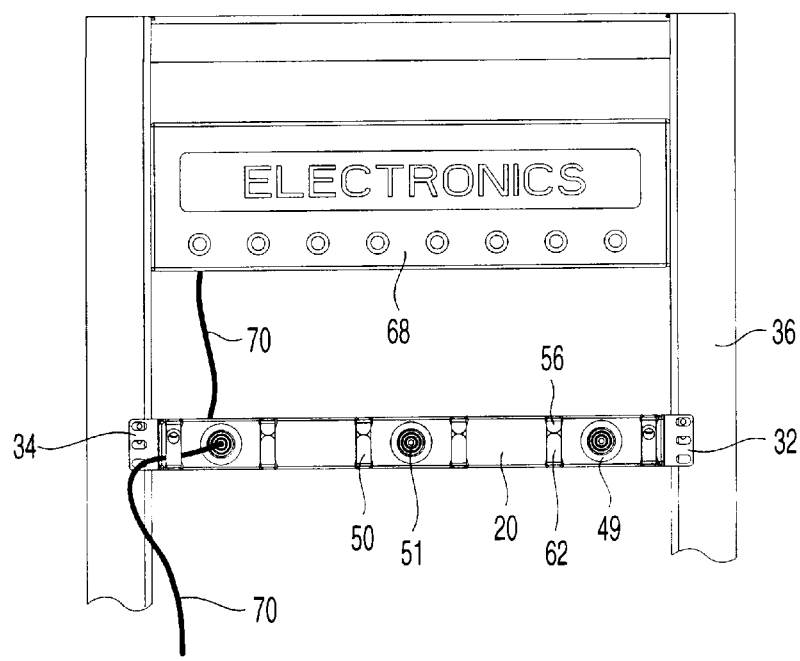
FIG. 3 is a front elevational view of the assembly and portion of the rack of FIG. 2.

An electronic component 68 may also be mounted in the rack 36 as shown in FIGS. 2 and 3. Typically, the electronics component 68 have connections on its back side 72 requiring the fiber optic jumpers 70 to emanate from the back. However, the jumpers 70 usually need to be routed back to the front of the rack 36 to connect with other components (such as with connector panels in a connector panel housing, not shown) in the same rack 36 or a neighboring rack (not shown). As shown in FIGS. 2 and 3, the fiber optic jumpers 70 extend from the back side 72 along a support tray 14, through a portal 49 in the front panel 12. From there, the fiber optic jumpers 70 can be routed to other components (not shown) or other racks. While electronic component 68 is shown above assembly 10, electronic component 68 may also be mounted below assembly 10. Indeed, if two electronic components are mounted in a rack with a single assembly, then the assembly could be mounted with one above and one below.

It will be apparent to those skilled in the art that various modifications and variations can be made in the disclosed process and product without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

We claim:

1. An optical fiber management assembly for routing optical fiber from a rearward side of an electronic component to a front side of an equipment rack, the management assembly comprising:

a panel adapted for mounting to the equipment rack, the panel having at least one portal for allowing the optical fiber routed from the rearward side of the electronic component to pass therethrough to the front side of the equipment rack; and at least one support tray extending rearward from the panel to guide and support the optical fiber routed from the rearward side of the electronic component to the front side of the equipment rack.

2. The optical fiber management assembly according to claim 1, further comprising at least one routing clip mounted in the at least one tray to retain the optical fiber within the at least one support tray.

3. The optical fiber management assembly according to claim 1, further comprising a plurality of brackets on a front surface of the panel and extending forward therefrom to guide and support the optical fiber forward of the front surface of the panel.

4. The optical fiber management assembly according to claim 1, wherein the at least one support tray comprises two support trays mounted at respective ends of the panel.

5. The optical fiber management assembly according to claim 1, further comprising a cover removably mounted to the panel.

6. The optical fiber management assembly according to claim 1, wherein the at least one portal comprises a plurality of portals spaced along the panel.

7. The optical fiber management assembly according to claim 1, wherein the at least one support tray comprises a flange for mounting the at least one support tray to the equipment rack, the flange being attached to the at least one support tray rearward of the panel such that at least a portion of the panel is positioned forward of the equipment rack.

8. The optical fiber management assembly according to claim 1, wherein the at least one support tray has a cross-section that is substantially u-shaped.

9. A method of routing optical fiber in an equipment rack using an optical fiber management assembly, the equipment rack having an electronic component and a connector panel housing, the optical fiber management assembly comprising a panel adapted for mounting to the equipment rack, the panel having at least one portal for the optical fiber to pass therethrough and at least one support tray extending rearward from the panel, the method comprising the steps of:

guiding the optical fiber along the support tray with a first end of the optical fiber extending through the portal;

attaching a second end of the optical fiber to the electronic component; and attaching the first end of the optical fiber to the connector panel housing.

10. The method according to claim 9 comprising the further step of retaining the optical fiber within the at least one support tray in a routing clip mounted in the at least one support tray.

11. The method according to claim 9, wherein a length of the optical fiber extends through the at least one portal, the method comprising the further step of guiding and supporting the length of the optical fiber extending through the portal in a plurality of brackets on a front surface of the panel and extending forward therefrom.

12. An optical fiber management assembly for routing optical fiber from a rearward side of an electronic component to a front side of an equipment rack, the management assembly comprising: a panel adapted for mounting to the equipment rack, the panel having at least one portal for allowing the optical fiber routed from the rearward side of the electronic component to pass therethrough to the front side of the equipment rack; at least one support tray extending rearward from the panel to guide and support the optical fiber routed from the rearward side of the electronic component to the front side of the equipment rack; and a grommet positioned within the at least one portal of the panel to protect the optical fiber routed from the rearward side of the electronic component as the optical fiber passes through the at least one portal to the front side of the equipment rack.

13. An optical fiber management assembly according to claim 12 further comprising a plurality of brackets on a front surface of the panel and extending forward therefrom to guide and support the optical fiber along the front surface of the panel.

14. An optical fiber management assembly according to claim 12 wherein at least a portion of the panel is positioned forward of the equipment rack.

* * * * *